United States Patent [19]

Dudley

[11] 3,981,464
[45] Sept. 21, 1976

[54] AIRPORT TERMINAL
[75] Inventor: Robert E. Dudley, Bellevue, Wash.
[73] Assignees: Richard M. Tracey; Gerald R. Brunstrom, both of Seattle, Wash. ; part interest to each
[22] Filed: Aug. 6, 1970
[21] Appl. No.: 61,675

Related U.S. Application Data
[60] Division of Ser. No. 852,969, Aug. 18, 1969, Pat. No. 3,554,470, which is a continuation of Ser. No. 645,213, June 12, 1967, abandoned.

[52] U.S. Cl. ............................ 244/114 R; 14/71.5; 52/64
[51] Int. Cl.² ............................................ B64F 1/36
[58] Field of Search ........... 244/114, 118, 137, 138; 14/71; 214/38 B, 38 BA; 52/64, 126, 236

[56] References Cited
UNITED STATES PATENTS

| | | | |
|---|---|---|---|
| 2,750,135 | 6/1956 | Anderson | 244/114 |
| 3,136,267 | 6/1964 | Kness | 244/114 X |
| 3,162,404 | 12/1964 | Squire | 244/114 |
| 3,317,942 | 5/1967 | Wollard et al. | 14/71 |
| 3,541,743 | 11/1970 | Kness | 14/71 X |

*Primary Examiner*—Duane A. Reger
*Assistant Examiner*—Galen L. Barefoot
*Attorney, Agent, or Firm*—Robert W. Beach

[57] ABSTRACT

An airport terminal building or dock includes a recess into which an airplane wing can be moved spanwise, and a shiftable platform running on rails can support an airplane for movement transversely of the length of its fuselage to locate the airplane wing within the terminal building and the airplane fuselage alongside the terminal building. An airplane can be loaded by elevators adjacent to the terminal building and by a walkway supported by the terminal building and movable downward into a position alongside the airplane fuselage, which walkway in such position connects the terminal building passenger station and the airplane fuselage for transferring passengers between them.

8 Claims, 8 Drawing Figures

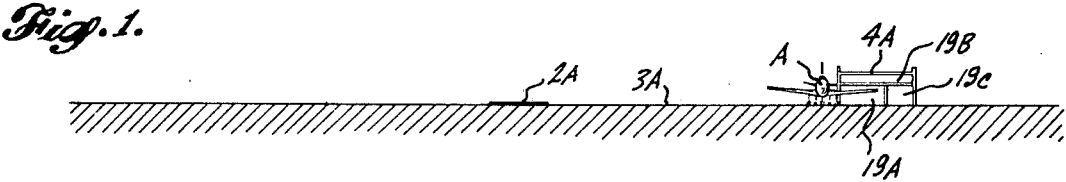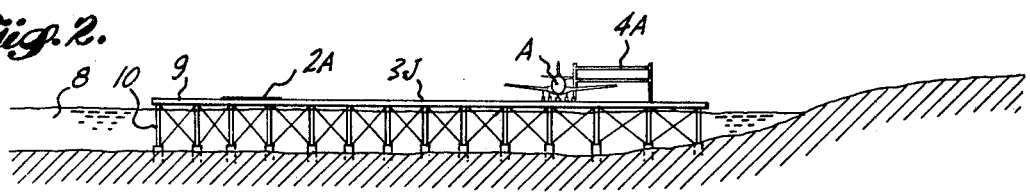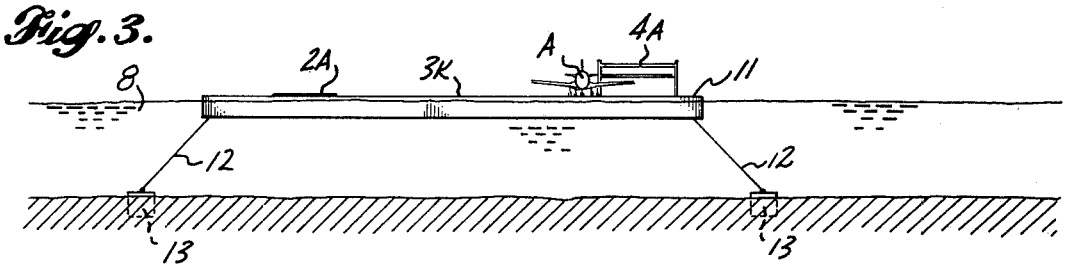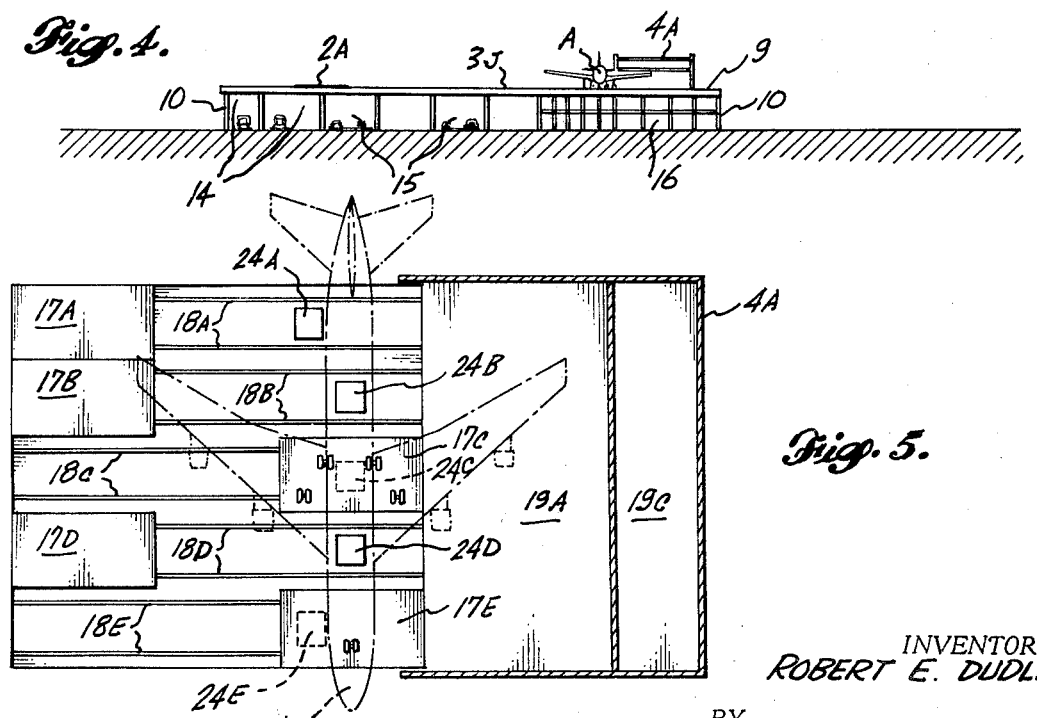

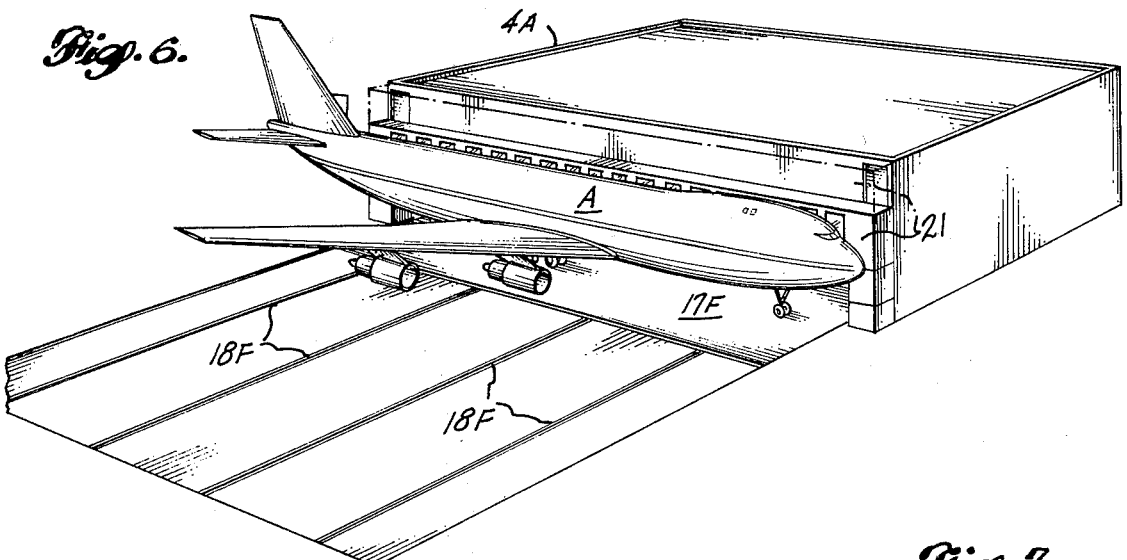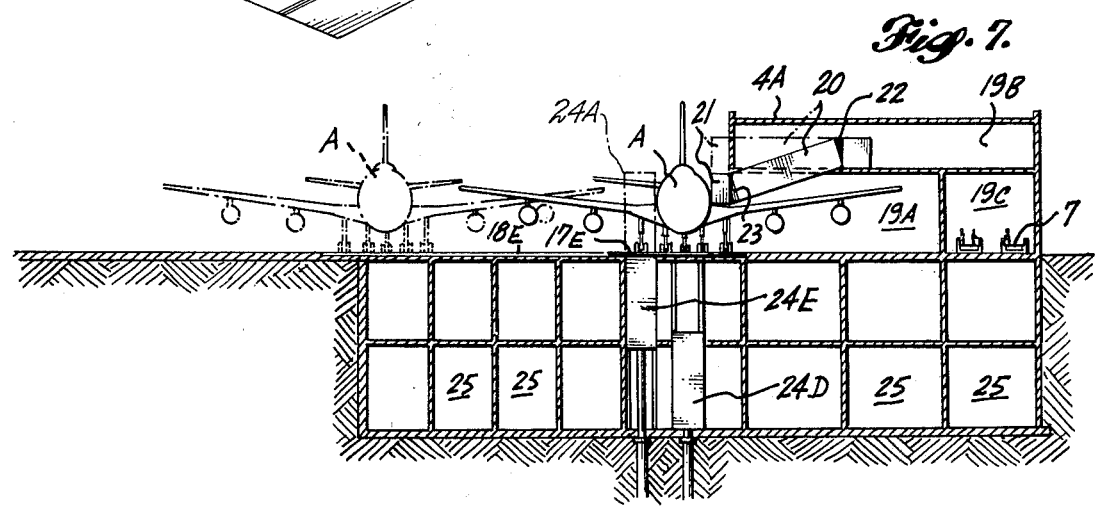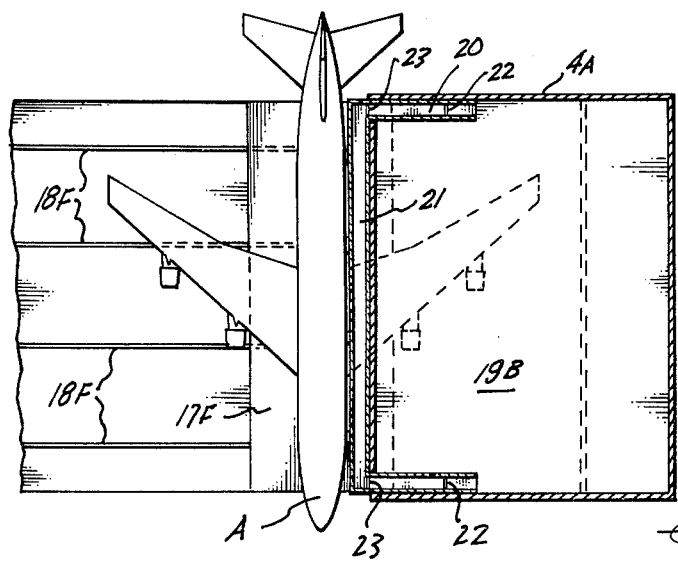

AIRPORT TERMINAL

This application is a division of application Ser. No. 852,969, filed Aug. 18, 1969 now U.S. Pat. No. 3,554,470, for Airport, which is a continuation of application Ser. No. 645,213, filed June 12, 1967 now abandoned for Airport.

Air transportation has become increasingly more popular, resulting in the construction and prospect of progressively larger and faster airplanes, but such airplanes cannot along solve the problems of air travel. The increase in popularity of air travel has resulted largely from the greater speed and convenience associated with it. As airplanes increase in size and the amount of air traffic increases, larger airports having longer runways and bigger and better air terminal facilities are required, yet the increase in size of airplanes has the disadvantage of making it difficult and time-consuming to move such airplanes into close proximity to an airport dock or building, and to facilitate the loading and unloading of passengers, baggage and cargo.

It is a principal object of the present invention, therefore, to provide a type of air terminal which can be used readily by large and fast airplanes.

More particularly, it is an object to provide such an airport terminal located adjacent to rights of way which can have multiple use, such as for runways and taxiways, as well as for surface transportation facilities, such as railway lines and roadways, and provide an airport terminal arrangement in which the time required for maneuvering the airplane on the ground, for taxiing and for parking will be minimized and interference between airplanes taxiing or parking will be reduced.

An additional object is to provide air terminal facilities which will expedite loading and unloading of aircraft.

Another object is to provide an arrangement for an airport terminal building which will facilitate servicing of the aircraft while it is being loaded and unloaded, and which will provide protection for servicing personnel from inclement weather.

FIGS. 1, 2, 3 and 4 are transverse vertical sections through different types of airport structures according to this invention.

FIG. 5 is a plan of one portion of an airport according to the present invention.

FIG. 6 is a top perspective of a similar portion of an airport showing a somewhat modified construction.

FIG. 7 is a transverse vertical section through an airport terminal structure of the type shown in FIG. 5.

FIG. 8 is a plan of a portion of an airport structure like that shown in FIG. 6 and similar to that shown in FIG. 7.

The airport terminal of the present invention has three principal characteristics: first, the arrangement of the terminal close to rights of way which can be shared between airplane runways and taxiways and surface transportation; second, the arrangement of the airport terminal relative to taxiways to facilitate movement of large airplanes from a taxiway to the air terminal building and from such building back to the taxiway, and, third, expediting loading and unloading of airplanes at the air terminal building.

Different expedients may be utilized in different localities to provide an economical location for airport runways and taxiways, and particularly locations in which rights of way can be shared between runways and taxiways for airplanes and rights of ways for surface transportation; FIG. 1 simply shows a taxiway 2A and an apron 3A on land. In some instances, however, it may not be possible to find a practical location of the desired size and arrangement on land near a metropolitan area. Such a metropolitan area may be located close to a body of water, and FIGS. 2 and 3 show a construction in which the entire airport is located over water. In FIG. 2, the taxiway 2A, the apron 3J and the terminal buildings 4A are located over a shallow body of water 8 on a platform 9 supported by piles or columns 10, extending downward through the water to the ground. Where the body of water 8 is deeper, as shown in FIG. 3, the taxiway 2A, apron 3K and air terminal buildings 4A can be mounted on a floating hollow concrete deck 11 which is moored in a desired location by mooring lines 12, secured in place by bottom anchors 13.

A particularly economical type of construction when all factors are considered is the construction of an airport arrangement near a metropolitan center on property providing multiple land use. In FIG. 4, as in the construction of FIG. 2, the taxiway 2A, apron 3J and air terminal buildings 4A are constructed on a deck 9 supported on columns 10. In this instance, however, the installation is over land, and, as shown in FIG. 4, the columns are arranged to provide bays between them suitable for ground transportation facilities and for other purposes. Thus, the bays 14 are shown as accommodating railway lines which may be used for rapid transit trains serving the airport. Bays 15 may be used for express highways or freeways, which again may serve the airport. The bays 16 can be divided into storage and cargo handling areas beneath the air terminal buildings.

Multiple use of the airport area can, of course, involve a combination of the types of structure shown in FIGS. 1, 2, 3 and 4. Thus, for example, the airport could be built partially over water and partially over land in which the entire airport is constructed on a deck 9, as shown in FIGS. 2 and 4, but part of such deck can be over water and the other part over land. The portion over land could also contain rights of way for ground transportation. It is not unusual for railway tracks or highways to skirt bodies of water near metropolitan centers. If a portion of the water were too deep to support a deck 9 practically entirely on columns, a portion of such deck could be made to float on the body of water, as indicated in FIG. 3, if the water level could be controlled. Also, of course, part of an airport construction could be on an elevated deck 9 and another portion could be on ground.

The second and third major goals are to provide an airport having airplane parking facilities and an airport terminal building which will greatly expedite parking, unloading and loading of airplanes. Such construction is shown principally in FIGS. 5 to 8. Airplanes are parked conventionally by the airplane being taxied into position adjacent to an air terminal building. When the airplane has been loaded, it either taxis away from the air terminal building, or, on some occasions, must be towed away from the air terminal building by a tractor before it can taxi on its own power.

Ground maneuvering of a large airplane has required considerable space. Also, in order to avoid interference between airplanes, modern practice has been to provide fingers extending out from the main air terminal building alongside which airplanes can be positioned, which entails long walks for passengers. In addition, some airports provide mobile extendable passageways which can be projected out from an air terminal building or finger to an airplane. Because of the increasing size of airplanes, the physical operation simply of loading passengers into and unloading them from an airplane becomes more complex.

The larger the airplane, the more passengers it is necessary to load and unload, perhaps as many as several hundred. To expedite such loading and unloading, it may be desirable to use several doorways spaced along the airplane fuselage. At the same time, the amount of baggage for such a larger number of passengers is increased correspondingly. More room must be provided for such number of passengers in the airport terminal building. More room must be provided for parking such large airplanes. Thus, the entire problem of saving time in the use of such airplanes is greatly aggravated. The benefit of decreasing the elapsed time of a supersonic airplane in flying between major population centers can be greatly reduced, if not offset almost completely, by the time required for parking, loading and unloading such an airplane at a congested airport, handling movement of passengers and baggage between airplane and ground transportation facilities, and transporting the passengers between a remotely located airport and the population center.

In the airport of the present invention, great savings of time can be accomplished by making each airport building of a size to provide a station serving only one airplane at a time. A single airplane may utilize two or more of such buildings and stations. It is not necessary for any particular airline to have a large number of such buildings, however, because they are constructed to unload and load passengers and baggage in large airplanes and to service such airplanes quickly and efficiently, so that a particular airplane is stationed at a given airport terminal building station for a minimum length of time. Also, provision is made for moving an airplane into a position parked at such a building or dock quickly and moving it away from such building quickly.

It is not intended that an airplane be parked at such an air terminal building station or dock for an appreciable length of time. Passenger movement between airport terminal buildings is expedited by shuttle bus service or by movable sidewalks 7 passing through the air terminal buildings so as to expedite transfer of passengers from one flight to another whether of the same airline or of different airlines.

To expedite parking of airplanes at the air terminal buildings, the apron 3A, 3J or 3K adjacent to such buildings will be large enough so that an airplane can taxi in one direction or the other into a position in front of the airport terminal building station where the airplane is to be loaded and/or unloaded. From such position, the airplane will be moved transversely of its length, i.e. sideways, toward the airport terminal building until the wing of the airplane has actually been moved into the building and the airplane fuselage has been moved into a position close alongside one side of the building. When the loading and/or unloading operation of passengers and baggage has been completed, the airplane will be moved sideways to a location far enough from the airport terminal building so that the airplane can maneuver easily and quickly in taxiing to a taxiway 2A.

Various expedients can be used for shifting an airplane sideways into and out of parked position alongside an air terminal building. The landing gear of an airplane itself may be designed to support the airplane for sideways movement, in which event pulling means such as endless cables or chains could be provided to roll the airplane along the apron directly toward and away from an airport terminal building. It is preferred, however, to provide transfer means for the airplane in the form of movable platform means onto which the airplane is taxied. Thus, in FIG. 5, sectional transfer platform means are illustrated as being composed of a plurality of platform sections 17A, 17B, 17C, 17D and 17E, which are movably supported, respectively, on depressed tracks 18A, 18B, 18C, 18D and 18E.

The platform sections which will support a particular airplane for transfer to a position alongside the air terminal building will depend upon the type and size of airplane, the location of the landing gear on such airplane, and the direction in which the airplane is headed. In FIG. 5, the landing gear is shown as being positioned on platform sections 17C and 17E so that it is necessary to move only such sections in order to transfer the airplane. If the airplane were headed in the opposite direction, it would be supported on sections 17A and 17C. In some instances, it might be necessary to shift two adjacent platform sections as well as another platform sections. Also, the size and number of the shiftable platform sections could differ according to the types of airplanes to be accommodated on the particular transfer means.

The airplane would be positioned on such transfer means so that the empennage would project beyond one end of the airport terminal building, as shown in FIG. 5. A wing-housing compartment 19A is provided in each airport terminal building to receive one wing of the airplane by spanwise movement of it, as shown in FIGS. 5, 7 and 8. Above this wing-housing compartment is a passenger-accommodation compartment 19B having a passenger floor, shown in FIGS. 7 and 8. Below this passenger-accommodation compartment is a further compartment 19C shown in FIGS. 5 and 7 which could provide for a movable sidewalk 7 and perhaps for offices and other facilities. The size and shape of each terminal building can, of course, be designed to meet the requirements of a particular airline or airport.

Passengers can be loaded into or unloaded from several doors spaced along the length of the fuselage of an airplane A by two or more ramp corridors 20 the opposite sides of which support an aisleway corridor or gallery 21 as shown in FIG. 7, which can be lowered from the broken-line position shown in FIG. 7 at least substantially as high as the top of the airplane alongside the building to the solid-line position of that figure alongside the airplane fuselage. Hinge sections 22 and 23 adjacent to opposite ends of the ramps 20 enable such ramps to tilt into inclined positions as may be necessary to accommodate the elevational movement of the aisleway. The floors of such ramp corridors constitute ramps by which passengers may walk between the passenger-accommodation compartment 19B of the terminal building A and the aisleway corridor 21, when such ramps have been adjusted to the solid line position shown in FIG. 7. Passengers may also be loaded into at least one doorway at the side of the airplane fuselage remote from the air terminal building by an elevator 24A raisable from a position below the ground level.

Additional elevators 24B, 24C and 24D can be arranged immediately below the airplane, as shown in FIGS. 5 and 7, for the purpose of lifting baggage and cargo from a location below ground level into a position adjacent to the bottom of the airplane fuselage or even into the airplane fuselage, depending upon the design of the airplane. Various compartments 25 below ground level and below the air terminal building as shown in FIG. 7 can be utilized for storage, offices and other facilities. Also, another elevator 24E can be provided to service the rear portion of an airplane fuselage if it is headed in the direction opposite that shown in FIG. 5.

When the loading of an airplane has been completed, the elevators will be lowered to a position below the ground level, the ramps 20 will be swung to raise the aisleway 21 into the broken-line position shown in FIG. 7, and the transfer platform sections will be shifted from positions alongside the airport terminal building into their outer positions at the left of FIG. 5. By this manipulation, the airplane will be transferred into a position where its wing has been withdrawn from the compartment 19A of the air terminal building so that the airplane is free to taxi out to the taxiway. While the airplane is in the position alongside the air terminal building, the engines below the wing in the compartment 19A can be serviced, and fuel can be supplied to that airplane wing without the workmen being exposed to the weather. Moreover, such compartment prevents access of the public to the airplane wing.

Instead of the airplane transfer platform being divided into sections, as shown in FIG. 5, such platform can be unitary, as shown in FIGS. 6 and 8. In such event, the entire platform 17F will be supported on suitable rails 18F spaced along the length of the platform. Endless chains or cables connected to the transfer platform means can be operated to shift such means toward and away from the air terminal building in the manner described. The outer location of the transfer platforms and the distance between adjacent transfer platforms for adjacent air terminal buildings must, of course, be sufficiently great to enable an airplane to taxi easily onto and off such platform means without substantial risk of colliding with an airplane parked at an adjacent air terminal building or running into the depression left by movement of adjacent transfer means into a position alongside its terminal building.

I claim:

1. An air terminal comprising a building having a side with a recess opening at said side for receiving therein the wing of an airplane the fuselage of which is disposed alongside said building side with the length of such fuselage extending generally parallel to said building side, said building including a passenger station adjacent to said building side, an elongated aisleway corridor alongside said building side of a length to extend along the major portion of the length of such an airplane fuselage, having its length extending substantially parallel to said building side, disposed above and spanning across such an airplane wing received in said wing-receiving recess of said building, means for moving said aisleway corridor elevationally upward and downward between a lower position affording substantially level transfer of passengers between said aisleway corridor and such airplane fuselage and an upper retracted position, two elongated ramp corridors spaced lengthwise of said aisleway corridor, having their lengths extending transversely of the length of said aisleway corridor and affording communication between said building passenger station and said aisleway corridor, and hinge means connecting said ramp corridors, respectively, to said passenger station and to said aisleway corridor for tilting of said ramp corridors relative to said passenger station and to said aisleway corridor about axes extending substantially parallel to the length of said aisleway corridor by elevational movement of said aisleway corridor relative to said building.

2. The air terminal defined in claim 1, in which the building passenger station is above and extends across the wing-receiving recess.

3. The air terminal building defined in claim 1, in which the upper retracted position of the aisleway corridor is at least substantially as high as the top of the airplane fuselage alongside the building.

4. A passenger embarking and debarking facility for aircraft having wing-tips of a predetermined height and a fuselage of a predetermined length from the front of the aircraft to a point adjacent to the stabilizer of the aircraft, comprising:
a building having a passenger floor disposed at an elevation which is above said predetermined height, said building being open along at least a portion of one side so as to expose an edge of said passenger floor and so that one wing of the aircraft may be received within the building below said passenger floor thereby permitting the aircraft to be parked alongside the building and parallel to the side thereof;
a horizontal elongated passenger boarding gallery disposed parallel to said passenger floor between the exposed edge of the latter and the aircraft, said gallery having a length about equal to said predetermined length of the aircraft forward of the aircraft stabilizer;
means for supporting said gallery from above to facilitate servicing of the aircraft from that portion of the edge below the level of said passenger floor and for raising and lowering said gallery in a continually horizontal position between an elevation above said predetermined height and an elevation below said predetermined height whereby said gallery may be raised to permit entry of one wing of the aircraft into the building and subsequently lowered to a position opposite one side of the aircraft fuselage for permitting movement of passengers between said gallery and the aircraft; and
an adjustable passenger access ramp extending between said passenger floor of the building and said gallery.

5. A passenger embarking and debarking facility for aircraft having wing-tips of a predetermined height and a fuselage of a predetermined length from the front of the aircraft to a point adjacent to the stabilizer of the aircraft, comprising:
a building having a passenger floor disposed at an elevation which is above said predetermined height, said building being open along at least a portion of one side so that one wing of the aircraft may be received within the building below said passenger floor thereby permitting the aircraft to be parked alongside the building and parallel to the side thereof;
a horizontal elongated passenger boarding gallery alongside said passenger floor between the latter and the aircraft, said gallery having a length about equal to said predetermined length of the aircraft forward of the aircraft stabilizer;

means for supporting said gallery from above said predetermined height to facilitate servicing of the aircraft below the level of said passenger floor and for raising and lowering said gallery in a continually horizontal position between an elevation above said predetermined height and an elevation below said predetermined height whereby said gallery may be raised to permit entry of one wing of the aircraft into the building and subsequently lowered to a position along one side of the aircraft fuselage for permitting movement of passengers between said gallery and the aircraft; and an adjustable passenger access ramp extending between said passenger floor of the building and said gallery.

6. A passenger embarking and debarking facility for aircraft having wing-tips of a predetermined height and a fuselage of a predetermined length from the front of the aircraft to a point adjacent to the stabilizer of the aircraft, comprising:

a building having a passenger floor disposed at an elevation which is above said predetermined height, said building being open along at least a portion of one side so that one wing of the aircraft may be received within the building below said passenger floor thereby permitting the aircraft to be parked alongside the building and parallel to the side thereof;

a horizontal elongated passenger boarding gallery alongside said passenger floor between the latter and the aircraft, said gallery having a length about equal to said predetermined length of the aircraft forward of the aircraft stabilizer;

and means for supporting said gallery from above said predetermined height to facilitate servicing of the aircraft below the level of said passenger floor and for raising the lowering said gallery in a continually horizontal position between an elevation above said predetermined height and an elevation below said predetermined height whereby said gallery may be raised to permit entry of one wing of the aircraft into the building and subsequently lowered to a position along one side of the aircraft fuselage for permitting movement of passengers between said gallery and the aircraft and for providing an adjustable passenger access ramp extending between said passenger floor of the building and said gallery.

7. A passenger embarking and debarking facility for aircraft having wing-tips of a predetermined height and a fuselage of a predetermined length from the front of the aircraft to a point adjacent to the stabilizer of the aircraft, comprising:

a building having a passenger floor disposed at an elevation which is above said predetermined height, said building being open along at least a portion of one side so that one wing of the aircraft may be received within the building below said passenger floor thereby permitting the aircraft to be parked alongside the building and parallel to the side thereof;

a horizontal elongated passenger boarding gallery alongside said passenger floor between the latter and the aircraft fuselage, said gallery having a length about equal to said predetermined length of the aircraft fuselage forward of the aircraft stabilizer;

and means for supporting said gallery from above said predetermined height to facilitate servicing of the aircraft below the level of said passenger floor, for guiding said gallery for raising and lowering in a continually horizontal position between an elevation above said predetermined height and an elevation below said predetermined height whereby said gallery in raised position may permit entry of one wing of the aircraft into the building and in lowered position along one side of the aircraft fuselage will permit movement of passengers between said gallery and the aircraft fuselage and for providing an adjustable passenger access ramp extending between said passenger floor of the building and said gallery.

8. A passenger embarking and debarking facility for aircraft having wing-tips of a predetermined height and a fuselage of a predetermined length from the front of the aircraft to a point adjacent to the stabilizer of the aircraft, comprising:

a building having a passenger floor disposed at an elevation which is above said predetermined height, said building being open along at least a portion of one side so that one wing of the aircraft may be received within the building below said passenger floor thereby permitting the aircraft to be parked alongside the building and parallel to the side thereof;

a horizontal elongated passenger boarding gallery alongside said passenger floor between the latter and the aircraft fuselage, said gallery having a length about equal to said predetermined length of the aircraft fuselage forward of the aircraft stabilizer;

and means for supporting said gallery for reception of an aircraft wing beneath said gallery to facilitate servicing of the aircraft below the level of said passenger floor and for raising and lowering said gallery in a continually horizontal position between an elevation above said predetermined height and an elevation below said predetermined height whereby said gallery in raised position may permit entry of one wing of the aircraft into the building and in lowered position along one side of the aircraft fuselage will permit movement of passengers between said gallery and the aircraft fuselage and for providing an adjustable passenger access ramp extending between said passenger floor of the building and said gallery.

* * * * *

PO-1050
(5/69)

UNITED STATES PATENT OFFICE
CERTIFICATE OF CORRECTION

Patent No. 3,981,464  Dated September 21, 1976

Inventor(s) Robert E. Dudley

It is certified that error appears in the above-identified patent and that said Letters Patent are hereby corrected as shown below:

Column 7, claim 6, line 40, cancel "the" and insert --and--.

Signed and Sealed this

First Day of March 1977

[SEAL]

Attest:

RUTH C. MASON
Attesting Officer

C. MARSHALL DANN
Commissioner of Patents and Trademarks